United States Patent [19]
Pruette et al.

[11] Patent Number: 5,591,338
[45] Date of Patent: Jan. 7, 1997

[54] FLUID FILTER

[75] Inventors: Dean M. Pruette; Stephen E. Larson, both of Blacksburg, Va.

[73] Assignee: Dollinger Corporation, Rich Creek, Va.

[21] Appl. No.: 473,935

[22] Filed: Jul. 7, 1995

Related U.S. Application Data

[63] Continuation of Ser. No. 335,977, Nov. 3, 1994, abandoned, which is a continuation of Ser. No. 51,659, Apr. 26, 1993, abandoned.

[51] Int. Cl.$^6$ .................................................. B01D 27/06
[52] U.S. Cl. ................................ 210/493.1; 210/493.2; 210/493.5; 55/491; 55/492; 55/498; 55/521
[58] Field of Search .................................... 210/440, 443, 210/232, 493.1, 493.2, 493.5, 497.01; 55/491, 492, 498, 499, 500, 521

[56] References Cited

U.S. PATENT DOCUMENTS

| | | |
|---|---|---|
| Re. 32,851 | 1/1989 | Tarala . |
| 2,298,980 | 10/1942 | Sloan et al. ........................... 210/493.5 |
| 4,058,463 | 11/1977 | Bartik ................... 210/497.01 |
| 4,481,110 | 11/1984 | Shannon ................... 210/451 |
| 4,652,285 | 3/1987 | Greene ................... 210/493.5 |
| 4,878,930 | 11/1989 | Manniso et al. ................... 55/493 |
| 5,059,223 | 10/1991 | Diebolder ................... 55/373 |
| 5,147,540 | 9/1992 | Hagan ................... 210/493.5 |
| 5,151,181 | 9/1992 | Barry ................... 210/487 |

*Primary Examiner*—W. L. Walker
*Attorney, Agent, or Firm*—Shefte, Pinckney & Sawyer

[57] ABSTRACT

A fluid filter is of the kind having a tubular flow-through core surrounded by a pleated wire cage around which a filter medium in the form of a pleated bag is mounted with the pleats in the bag extending into and around the pleats of the wire cage. The filter medium is formed by a sheet of filter material having draw-string ends which fold over and are tied down on opposite ends of the cage. Sealing assemblies which eliminate the need for conventional gaskets are used to seal the folded over and tied down ends of the filter medium. The arrangement facilitates the assembly, removal and re-use of filter media.

6 Claims, 3 Drawing Sheets

FLUID FILTER

This application is a continuation of application Ser No. 08/335,977, filed Nov. 3, 1994, now abandoned, which is a continuation of application Ser. No. 08/051,659, filed Apr. 26, 1993, now abandoned.

BACKGROUND OF THE INVENTION

This invention relates to industrial fluid filters, such as hot gas filters, of the kind in which a removable filter element, including an outer filter medium in the form of a cloth or like bag, is located in a filter vessel through which fluid to be filtered is adapted to flow.

In filters of the above kind, the removable filter element commonly comprises a central cylindrical core on which is mounted a generally cylindrical wire cage having lengthwise pleats or waves around its entire circumference. The outer bag-like filter medium is mounted around the cage and is also pleated so that the pleats in the filter medium fit in the corresponding pleats or waves of the wire cage. In use, when mounted in a fluid flow vessel, fluid can be caused to flow either inwardly or outwardly through the filter element so that filtered material collects either on the outer or inner surface of the filter medium.

It is necessary, in filters as referred to, for the opposite ends of the filter medium to be tightly sealed against the internal cage and core structure of the filter element, and to this end, different forms of gasketing assemblies have been used. Also, to secure and maintain the pleated shape of the filter medium, it has been common practice to fold over and stitch down the pleats at the opposite ends of the structure in one way or another. This tends to make the operations of replacing and/or re-using filter media somewhat difficult.

SUMMARY OF THE INVENTION

It is an object of the invention to provide an improved filter element of the kind described which has a filter medium and end seal structure that simplifies removal and replacement of filter media.

Another object of the invention is to provide a novel form of bag-like filter medium for filter elements as described, which eliminates the need for stitching at opposite ends of the filter medium.

Accordingly, the invention consists in a novel form of filter medium and end seal assembly for a filter element as described. In one aspect, the invention provides a filter medium which comprises a plane sheet of filter cloth or the like with draw-string ends. Thus, each end of the sheet is provided with a series of spaced apertures through which a draw-string is threaded. The size of the sheet is such that the sheet can be placed around the cage of the filter element and overlap the ends, so that the sheet can be formed into a cylindrical bag which can be pleated to fit in corresponding pleats or waves of the wire cage on which the bag is used.

Further, the length of the draw-string sheet is greater than the wire cage on which the sheet is to be used, such that end portions of the sheet including the draw-strings can be folded over the opposite ends of the cage and the draw-strings drawn tight. In accordance with another feature of the invention, the folded-over pleated ends of the sheet are adapted to be clamped down onto internal annular surfaces provided on the core of the filter element by screw-on or push-on end clamp assemblies.

Filter media according to the invention are simple to attach and replace. In assembling a filter element, it is simply necessary to place the draw-string sheet over the wire cage, press the pleats manually into the cage pleats, tighten the draw-strings at each end, and secure the end clamps. Removal of a used filter medium reverses the above procedure.

The invention eliminates the need for stitching at opposite ends of the filter medium, and simplifies the operation of replacing and reusing filter media.

Additional features and advantages of the invention will become apparent from the ensuing description and claims taken in conjunction with the attached drawings.

BRIEF DESCRIPTION OF DRAWINGS

FIG. 4 is a perspective view of a novel filter medium for use in the filter element.

DESCRIPTION OF PREFERRED EMBODIMENTS

Referring firstly to FIGS. 1 through 4, there is shown a filter element 10 (FIG. 1) for use in a fluid filtering vessel, part of which is shown in phantom. The filter element includes a novel bag-like filter medium 12 (FIG. 4). It is understood that in use, the filter medium 12 is secured on the outside of the filter element 10 and the filter element will be releasably secured by its top end to an attachment head 11 in the filter vessel.

Figure 2:
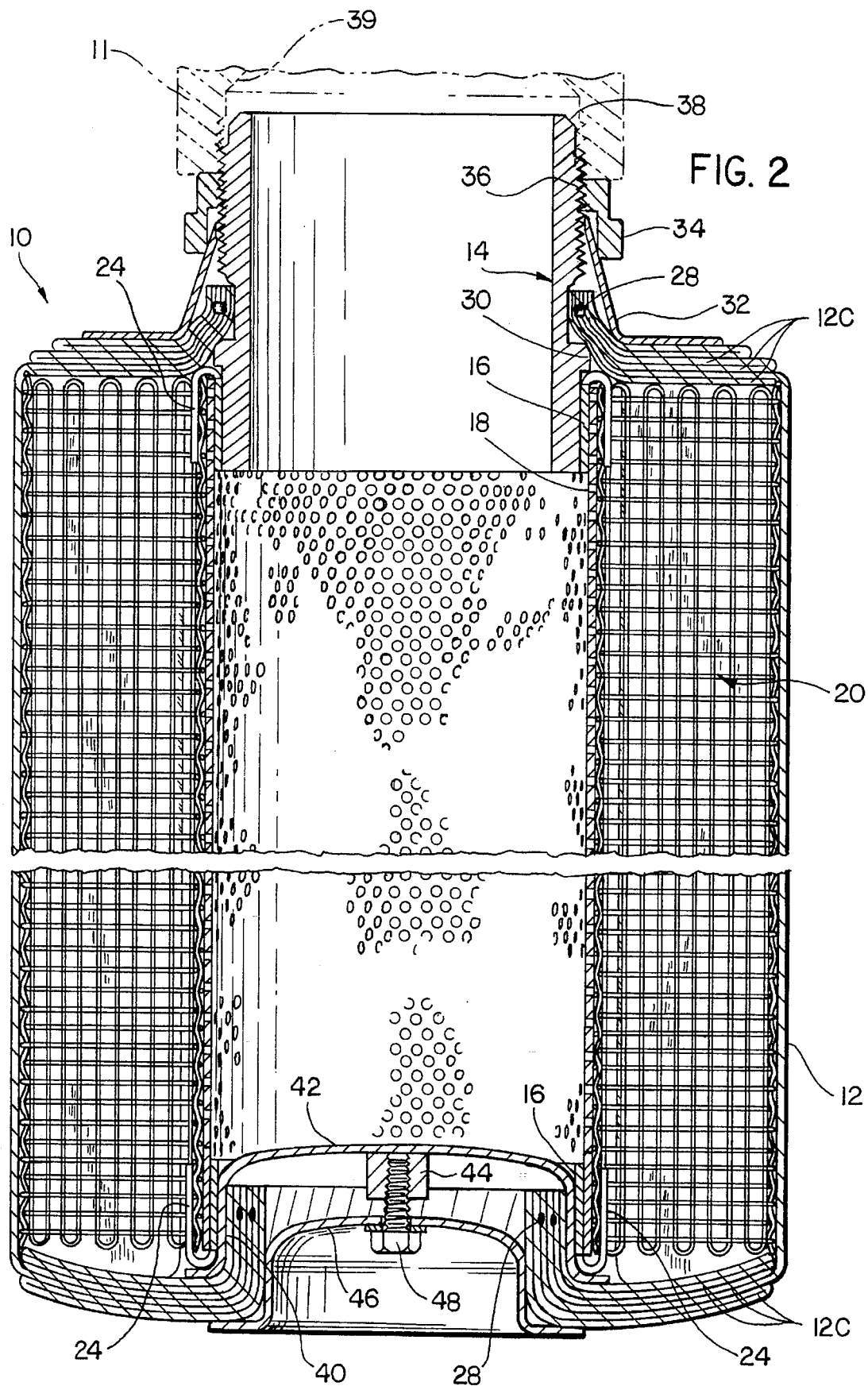
FIG. 2 is an enlarged sectional view on line 2—2 of FIG. 1.
Figure 3:
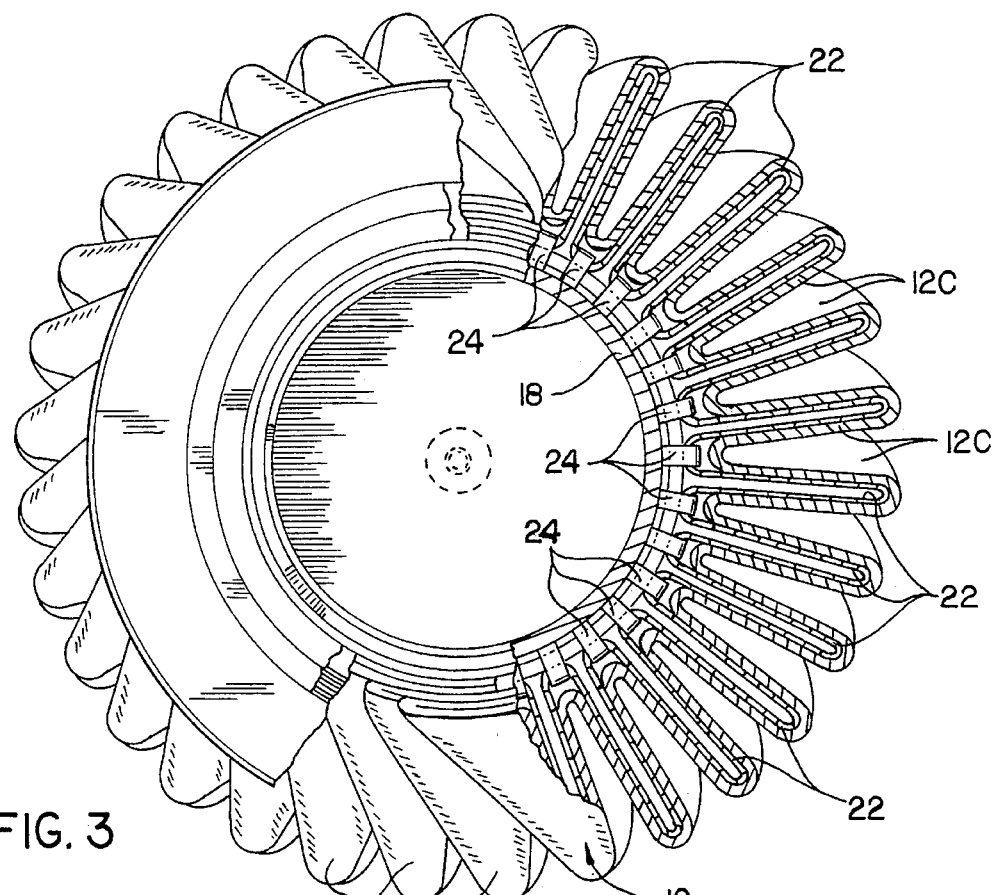
FIG. 3 is a plan view of the filter element, part broken away.

Referring more particularly to FIGS. 2 and 3, it will be seen that the filter element 10 comprises a central core formed by a cylindrical top end fitting or adaptor 14 and a perforated cylinder 18 welded around the end fitting, with an intervening ring 16, as will be described. A like ring 16 is welded to the bottom of cylinder 18. A wire mesh cage 20 surrounds the inner core, the cage being folded into adjacent pleats or waves 22. The wave-like form of the cage is maintained by U-shaped clips 24 formed on rings 16, each clip having an outer leg engaging over an internal bend of one of the pleats in the wire cage. The clips thus attach the cage to the internal core and also maintain the wave-like shape of the cage.

Figure 1:
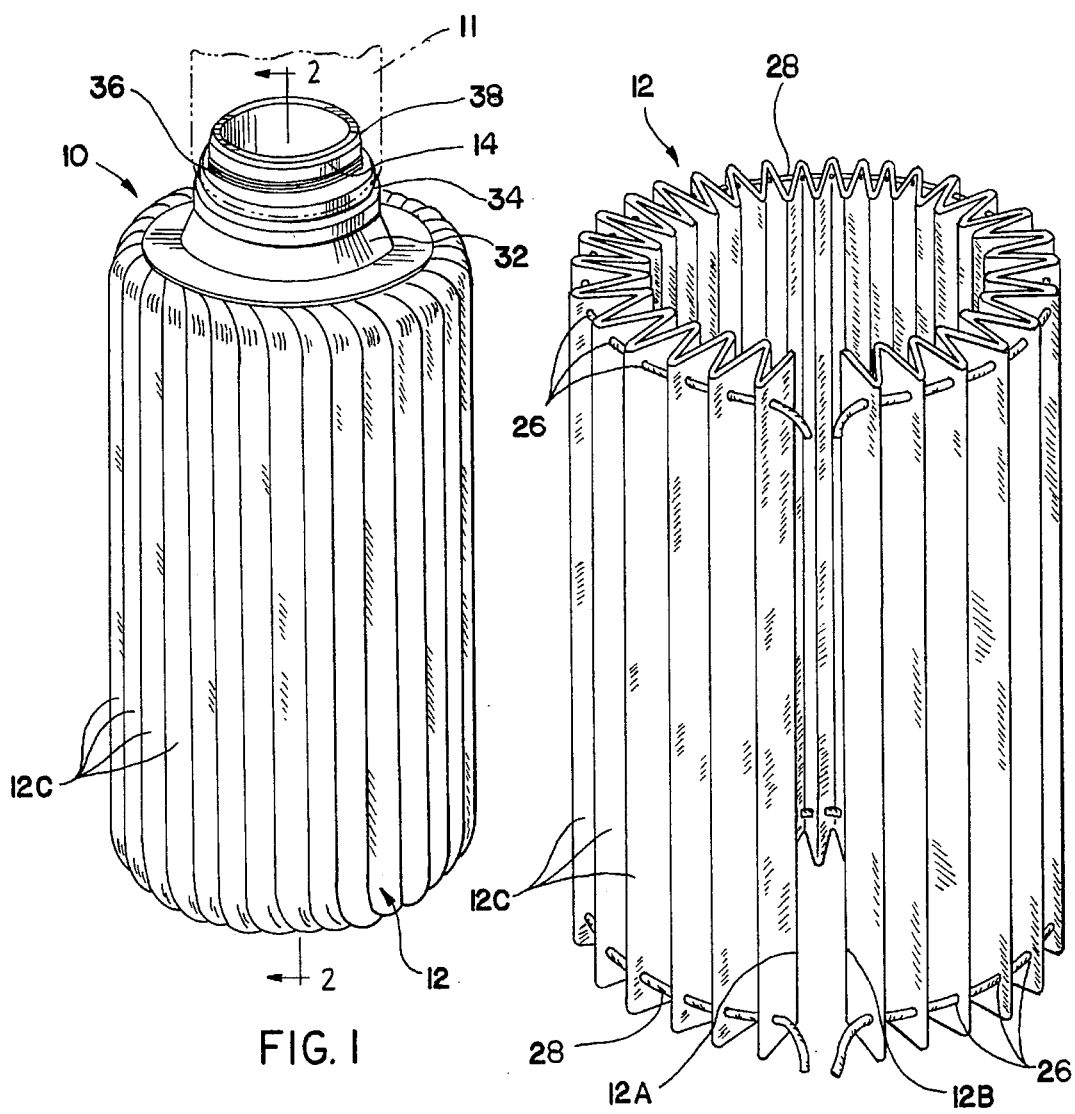
FIG. 1 is a perspective view of a filter element according to the invention.

The filter medium 12 comprises a rectangular sheet of any known filter cloth or the like which is formed into a cylindrical bag with adjacent side edges 12a, 12b as shown or alternatively, the bag may be closed. Opposite ends of the sheet are each provided with a row of spaced apertures 26 receiving respective draw-strings 28. The width of the sheet, and spacing of the apertures 26 is such that the sheet can be placed around the cage 20 and formed manually into pleats 12c to fit between and around the pleats 22 of the cage 20 as best seen in FIG. 3 with the opposite edges 12a, 12b of the sheet preferably overlapping somewhat. Also, the length of the sheet is greater than the length of the cage to the extent that its top and bottom pleated end portions will lay over the top and bottom ends of the cage when the draw-strings 28 and drawn tight and tied down. It is evident that in so doing, care is taken to lay the bag pleats at opposite ends sequentially one over another as seen in FIGS. 1 and 3.

At the top end of the filter element, the folded bag pleats tie down against an annular shoulder or ring 30 integrally formed around the outside of adaptor 14, and the bag is tightly sealed against the annular shoulder by a compression ring 32 which is tightened down onto the bag by a locking ring 34 engaged on threads 36 formed on the adaptor 14. The rings 32 and 34 in conjunction with shoulder 30 thus form a seal assembly effectively sealing the top end of the bag against the core without the need for a conventional gasket or the like.

It should here be noted that the upper end of the fitting 14 may be formed with an external bevel 38 to form a metal to metal seal with a corresponding seal 39 in the filter vessel head 11 when the filter element is threaded into the vessel head.

At the bottom end of the filter element, the folded bag pleats tie down against an inner annular wall 40 of a spun closure cup 42 welded into the bottom end of the core. At its center, the cup has a threaded hub 44 and a pressure cup 46 is tightened down onto the bag by means of a bolt 48 threaded into the hub in order to tightly seal the bag against the inner wall of cup 42, again dispensing with the need for conventional gaskets.

Figure 5:
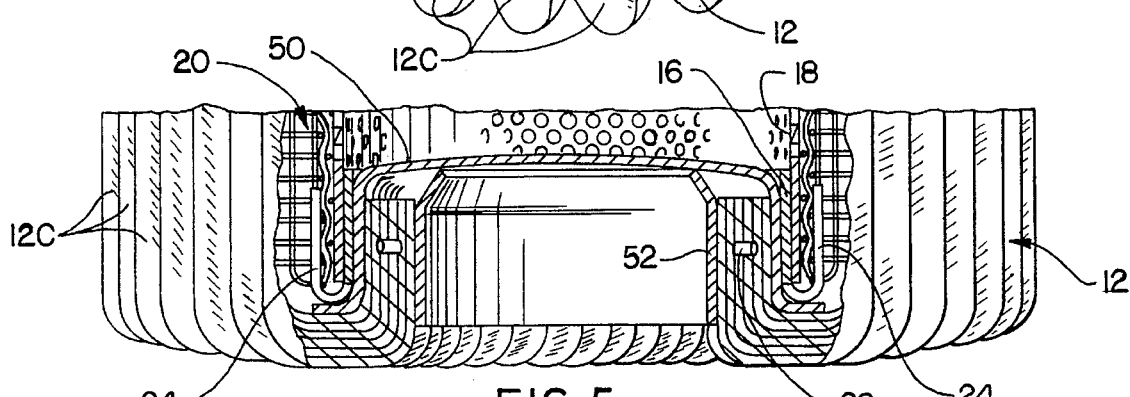
FIG. 5 is a sectional view of the bottom end of the filter element, similar to FIG. 2, showing an alternative form of end seal assembly.
Figure 6:
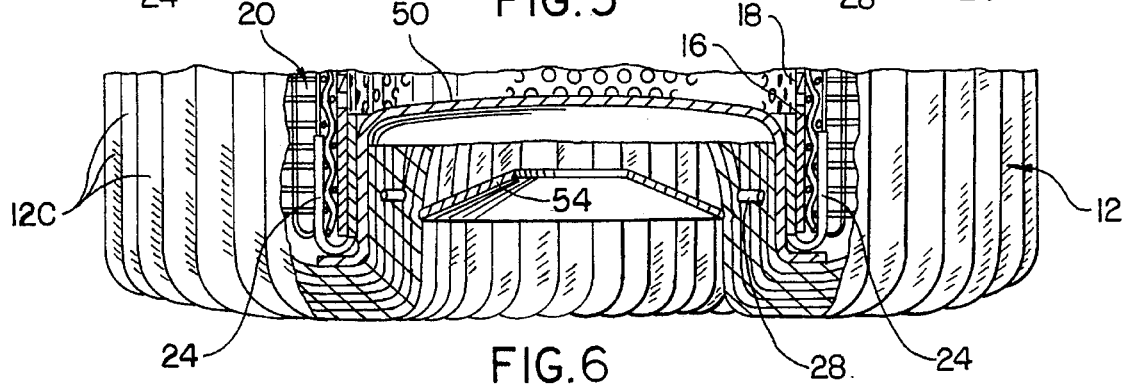
FIG. 6 is a view similar to FIG. 5 showing another alternative form of end seal assembly.

A modified bottom end sealing assembly for the bag is shown in FIG. 5. In this embodiment, the pleated end portion of the bag is tied down inside of spun closure cup 50 welded into the bottom of the core by a press-in outwardly sprung retaining band 52. In a further modified assembly as shown in FIG. 6, the retaining band 52 is replaced by a resilient retaining plate 54, the peripheral edge of which presses the folded over bag pleats tightly into sealing engagement with the inner surface of cup 50.

It is evident that in each embodiment of the invention, the filter element is simple to assemble, in situ, and effective end seals are provided for the filter medium without using conventional gaskets. Further, the filter medium is simple to remove and replace, and the draw-string structure facilitates cleaning and re-use of filter media.

In operation of filter elements according to the invention, fluid can be introduced through fitting 14 to flow outwardly through the filter medium or can flow inwardly through the filter medium and out through fitting 14.

While only preferred embodiments of the invention have been described herein in detail, the invention is not limited thereby and modifications can be made within the scope of the attached claims.

We claim:

1. A fluid filter element comprising a tubular flow-through core, a wire cage surrounding the core, the wire cage being formed into radial pleats extending around the circumference of the core, and a filter medium to be fitted around the cage and over opposite ends of the cage, the filter medium comprising a sheet of filter material having a row of apertures adjacent each of a pair of opposite ends of the sheet and a drawstring threaded in each row of apertures whereby the sheet can be fitted around said cage in the form of a substantially cylindrical bag, the sheet can be pleated into and around the pleats in the cage, and opposite pleated ends of the sheet can be folded over opposite ends of the cage and tied down by tightening the drawstrings, the filter element further comprising sealing means for opposite ends of the core for sealing the opposite pleated, folded over and tied down ends of the filter medium against the opposite ends of the core, wherein the core includes a tubular fitting at one end thereof and wherein the sealing means for said one end of the core comprises an annular ring surrounding said fitting, one folded over and tied down end of the filter medium fitting over said annular ring, a threaded portion on said tubular fitting outwardly of the annular ring and a ring means for applying external pressure on said one folded over and tied down end of the filter medium to seal same against said annular ring, the ring means including a locking ring adapted to thread on said threaded portion of the tubular fitting.

2. A fluid filter element as defined in claim 1, wherein the core includes a closure cup fitted in an opposite end thereof and wherein the sealing means for said opposite end of the core comprises an inner cylindrical wall of the cup against which an opposite folded over and tied down end of the filter medium is adapted to fit and a resilient press-in element adapted to fit inside of said opposite folded over and tied down end of the filter medium and exert outwardly directed pressure thereagainst to seal the filter medium against said inner annular wall.

3. A fluid filter element as defined in claim 2, wherein said press-in element comprises a cup-shaped retainer with an outer annular wall portion adapted to exert outwardly directed pressure against the filter medium.

4. A fluid filter element as defined in claim 2, wherein said press-in element comprises a plate-shaped retainer with a circumferential outer edge adapted to exert outwardly directed pressure against the filter medium.

5. A fluid filter element as defined in claim 1, wherein the ring means further includes a compression ring to fit between the locking ring and said one folded over and tied down end of the filter medium to apply pressure on the filter medium for sealing same against the annular ring.

6. A fluid filter element as defined in claim 1, wherein the core includes a closure cup fitted in an opposite end thereof into which an opposite folded over and tied down end of the filter medium is adapted to fit, and wherein the sealing means for said opposite end of the core comprises a pressure cup to fit over said opposite folded over and tied down end of filter medium, a bolt to extend through the pressure cup and a central threaded portion on said closure cup to receive the bolt whereby threading the bolt into said threaded portion causes the pressure cup to apply pressure against said opposite folded over and tied down end of the filter medium to seal same against an inner wall portion of the closure cup.

* * * * *